April 25, 1933.  W. H. McDONALD  1,905,239
ADVERTISING DEVICE
Original Filed Sept. 9, 1930  3 Sheets-Sheet 1
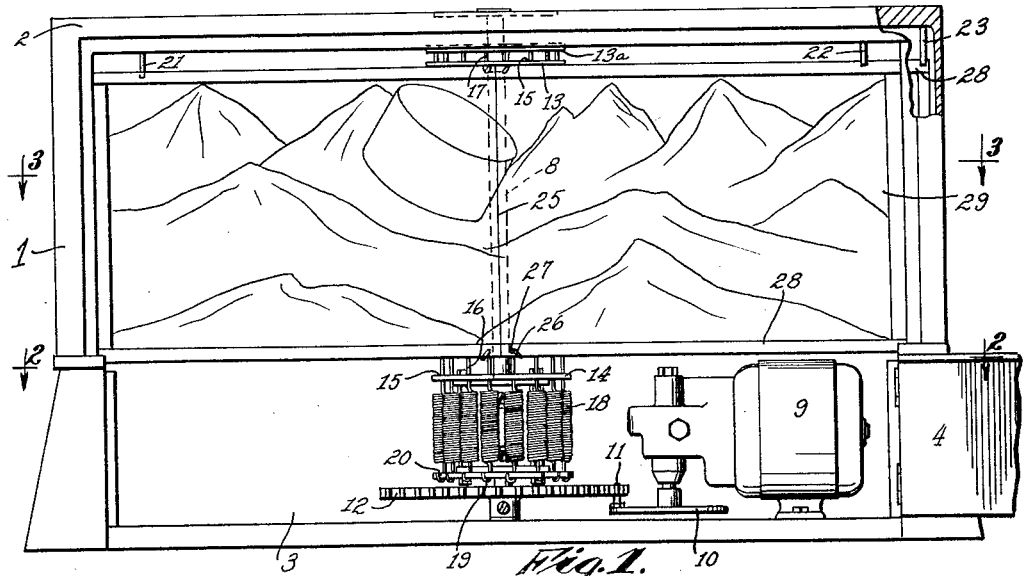

April 25, 1933.   W. H. McDONALD   1,905,239
ADVERTISING DEVICE
Original Filed Sept. 9, 1930   3 Sheets-Sheet 2
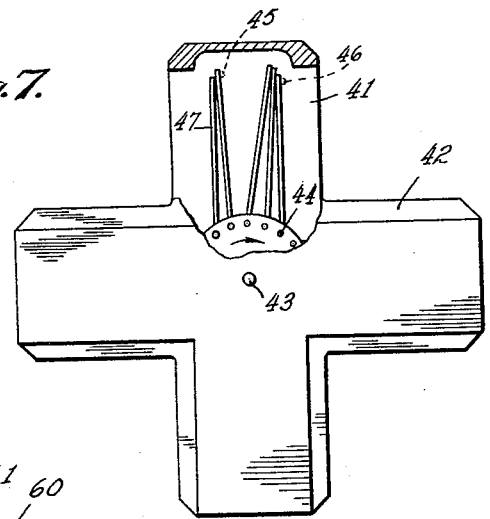
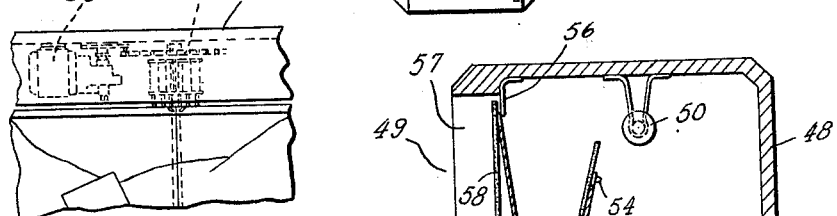
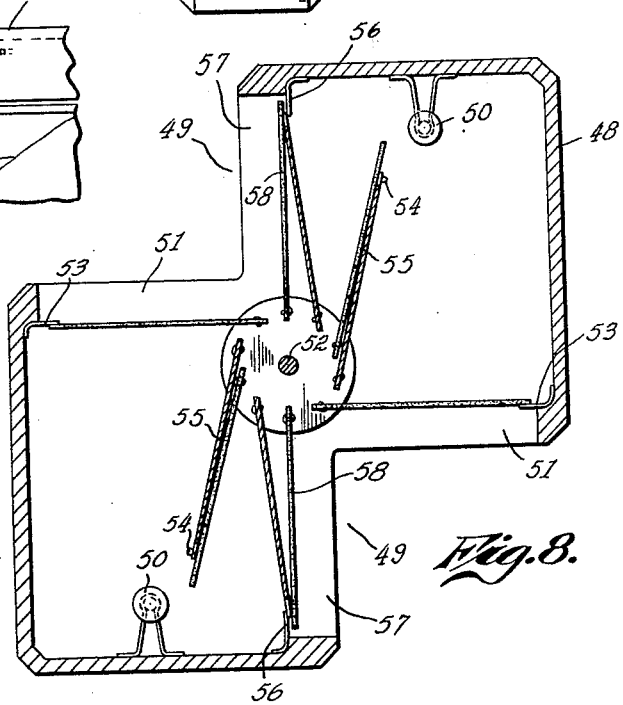
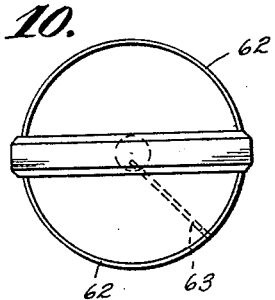

April 25, 1933.    W. H. McDONALD    1,905,239
ADVERTISING DEVICE
Original Filed Sept. 9, 1930    3 Sheets-Sheet 3
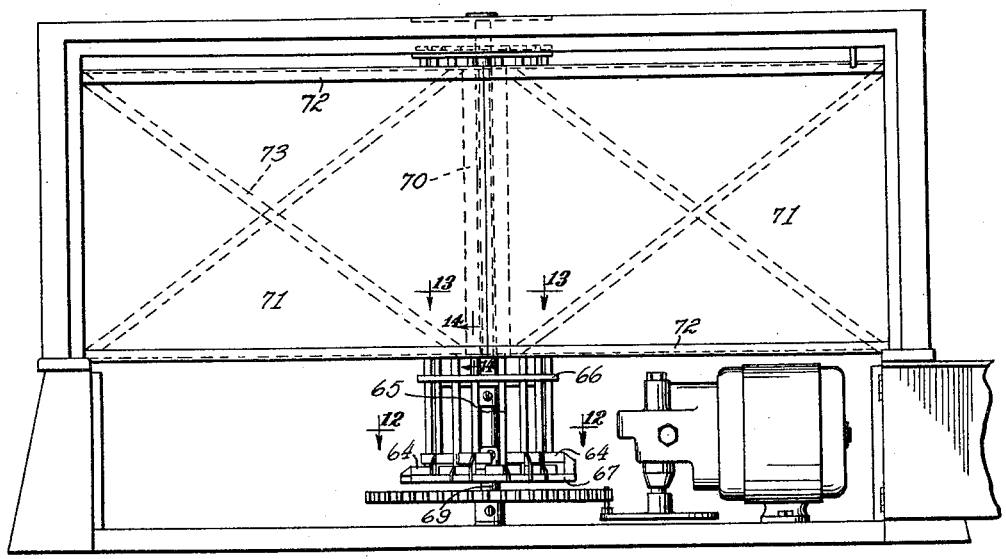
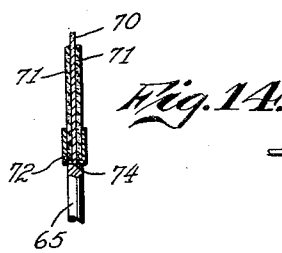
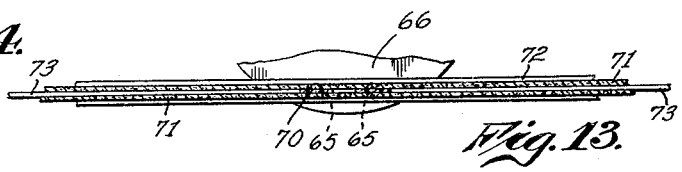
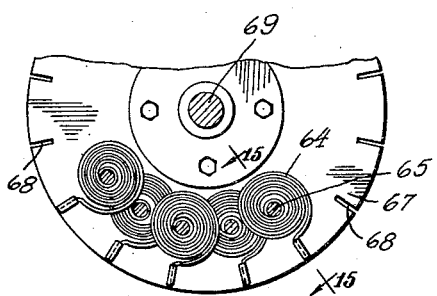
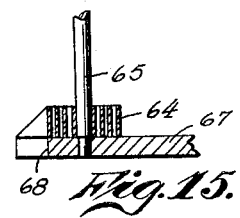
Inventor
William H. McDonald,
By Lyon & Lyon
Attorneys Patented Apr. 25, 1933

1,905,239

UNITED STATES PATENT OFFICE

WILLIAM H. McDONALD, OF OVERTON, NEVADA

ADVERTISING DEVICE

Application filed September 9, 1930, Serial No. 480,696. Renewed August 27, 1932.

This invention relates to an advertising or display apparatus for displaying cards or pictures in public places; such devices are used extensively for advertising purposes.

The general object of the invention is to provide means for supporting a plurality of cards so that the reading matter on them can be read from different directions, also to produce a device of this kind which, if desired can operate using transparent cards illuminated from the rear.

A further object of the invention is to provide a construction whereby two cards with their edges matched together can be displayed on the front of the device and two similar cards can be displayed with their edges together on the rear side of the device, the purpose being to enable the cards to be presented at the front and the rear so that the display surface will combine the area of two cards thereby enabling the printed matter on one of the cards to match up with the printing matter on an aligned card so that the reading line may pass across the abutting edges of the card.

A further object of the invention is to provide improved means for supporting the cards including card holders or frames into which the cards may be slipped when it is desired to change the cards.

It is contemplated that the invention may be embodied in an advertising apparatus to take the place of billboards such as are used in outdoor advertising, in which case, the cards and card holders may be of considerable size and weight. One of the objects of the invention is to provide means for securely supporting and guiding the cards when used in a construction of that type.

Further objects of the invention will appear hereinafter:

The invention consists of the novel parts and combination of parts to be described hereinafter, all of which contribute to produce an efficient advertising device.

A preferred embodiment of the invention is described in the following specification, while the broad scope of the invention is pointed out in the appended claims.

In the drawings:

Figure 1 is a front elevation of an advertising device embodying my invention showing the door of the casing in an open position and broken away so as to expose the operating mechanism.

Figure 2 is a horizontal section through the device taken on the line 2—2 of Figure 1, certain parts being broken away.

Figure 3 is a horizontal section taken through the device illustrated in Figure 1 on the line 3—3. This section passes through the cards and further illustrates the means for mounting them and the means for causing the exposed cards to abut against each other and align on the front and rear sides of the device so that the combined area of four cards will be simultaneously displayed.

Figure 4 is a vertical section taken at one of the lower spindles or pivots of one of the cards and illustrating the details of construction, certain parts being broken away. This view illustrates a modified means for securing the spindle or pivot of the card to the edge of the card.

Figure 5 is a view taken similarly to Figure 4, but illustrating another embodiment of torsion means which may be employed in mounting the cards in the device.

Figure 6 is a vertical section taken through the upper pivot of one of the cards showing contiguous parts broken away.

Figure 7 is a plan illustrating a modified embodiment of the casing or frame of the device which adapts the device for displaying cards simultaneously which can be seen from eight different directions.

Figure 8 is a horizontal section through an advertising device embodying the invention and adapted for displaying transparencies, that is to say, transparent pictures illuminated from the rear.

Figure 9 is a front elevation showing a portion of the upper part of the casing and adjacent displayed cards and illustrating a modification of the arrangement of the apparatus in which the driving motor can be located above the cards instead of below them as in Figure 1.

Figure 10 is a plan upon a greatly reduced scale illustrating the means which I may provide for guiding cards of large size where the apparatus is used for outdoor advertising or where the cards are of considerable weight requiring support at their outer edges.

Figure 11 is a view similar to Figure 1 but illustrating another embodiment of the invention in which the upper and lower pivots of the cards are connected together, and this view illustrates another embodiment of torsion means that cooperates in the operation of the device.

Figure 12 is a horizontal section taken about on the line 12—12 of Figure 11 and further illustrating the torsion means illustrated in Figure 11; this view shows certain parts omitted and others broken away.

Figure 13 is a horizontal section taken about on the line 13—13 of Figure 11 and further illustrating details of the holders or frames employed in the construction where it is desired to mount removable cards in holders or frames. In this view certain parts are broken away.

Figure 14 is a vertical section taken about on the line 14—14 of Figure 11 and further illustrating details of the card frames and the mounting of the cards, certain parts being broken away.

Figure 15 is a section taken about on the line 15—15 of Figure 12 and further illustrating details of the mounting of the torsion means for the pivots of the cards.

Before proceeding to a detailed description of the apparatus it should be stated that in practicing the invention, I construct the casing or frame of the device so that the display cards can be viewed from different positions. This may be accomplished in various ways, some of which are particularly illustrated and will be described hereinafter.

In one type of the apparatus the casing is in the form of an open frame so that two display openings are presented on its opposite sides. In one display opening two aligned cards with their abutting edges are displayed and in a similar manner the cards are displayed in the other opening. This enables the entire area of two combined cards to be displayed so that the advertising matter can be viewed from different directions.

In another embodiment of the invention the frame is made so that in plan it has substantially the form of a Maltese cross, each arm of the cross having a display opening on both sides and in each display opening a single card is displayed. This enables the surface of eight cards to be displayed singly and enables the device to present advertising matter when viewed from any direction.

The invention adapts itself also to the displaying of transparent pictures held in one position so that a light is presented behind the displayed picture and so that the same card can be held in another display position in which it would not be illuminated but in which it would be viewed as an ordinary card.

While I have illustrated the apparatus employing a plurality of cards mounted so that they swing around a common vertical axis, it should be understood that this is not essential and the apparatus can be mounted in any other position, for example, with the axis of rotation horizontal.

In the preferred embodiment of the invention the mechanism provides means for pivotally supporting the inner ends of a plurality of cards which rotate about a common axis and the pivots of the cards are mounted under a torsional strain. As the rotation takes place, the displayed card is detained for a period of time in its displaying position and finally becomes released whereupon the torsion means folds it around into place with the cards that have been displayed, and then the opposite side of the card is displayed. The cards may be mounted in various ways on their pivots. In the simplest form of mounting there is a pivot supporting the upper edge of the card and a pivot supporting the lower edge of the card and these pivots are in alignment with each other. If desired both pivots can carry the torsion means referred to but I prefer to employ torsion means in connection with only one of the pivots.

Referring more particularly to the parts and especially to Figures 1, 2 and 3, 1 represents a casing which is in the form of an open frame having a top bar 2 and a housing 3 at its lower side. For housing the driving mechanism, the front side of the casing may be provided with a hinged door 4 which in Figure 1 is represented in its open position and broken away.

The casing therefore presents two display openings as indicated at 5 and 6 in Figure 3. In the casing or frame between these two openings 5 and 6, I provide a plurality of cards 7 and I provide means for mounting these cards so that they are supported rotatably about a common axis parallel with the plane of the openings 5 and 6. In order to accomplish this I provide a central shaft 8 mounted for rotation in the casing. Any suitable means may be employed for rotating this shaft but it is preferably rotated with a step-by-step movement from an electric motor 9 that drives a disk 10 carrying a pin 11 that once in each revolution engages a tooth in a large gear wheel 12 rigidly secured to the shaft 8. In order to mount the cards I provide a pair of disks 13 and 14 which are rigidly secured on the shaft to rotate with it and these disks have aligning bearing openings as at 15 to receive pivots 16 at the lower ends of the cards and pivots 17 at the upper ends of the cards. I prefer to provide a collar or disk 13$^a$ rigid on the shaft above the disk 13 to give increased length for the bearing for the upper pivot 17.

As illustrated in Figure 1 each pivot 16 is an extension formed on the axis of a corresponding helical coil 18, the lower end of which is attached by a hook 19 to a disk or collar 20 rigidly secured on the shaft 8. These springs exert a torsional strain on the pivots 16 tending to rotate each pivot 16 on its longitudinal axis.

As illustrated in Figure 3 the direction of rotation is clockwise as indicated by the arrow. I provide means to detain the cards cooperating with the springs 18 to display the cards in the manner illustrated in Figure 3. For this purpose I provide a pair of detent pins 21 and 22 cooperating respectively with the springs 5 and 6. These pins may project down from the top bar 2. In Figure 3 they are represented in dotted lines because they are above the position where the cross section 3—3 is taken. In addition to this I provide other pins 23 and 24 located as indicated. The pins 21 and 22 are maintained to detain a card which is presenting its forward face to view whereas the pins 24 are located so as to hold back the bank of folded cards 7a (see Figure 3) in a position to enable the displayed card to display its rear face while matching up with its companion card, for example, in Figure 3, 7b and 7c indicate two cards aligned as indicated.

As illustrated in Figure 3, the frame is provided with recesses at its sides to receive the free edges of the banks of cards and this enables the edge of the frame to project over the edges of the cards that are located back of the exposed card. This is desirable to prevent illustrations on the exposed edges from interfering with the picture on the exposed cards.

The bearing openings 15 for the pivots of the cards are located at proper distance apart to enable the inner edges 25 of the cards to abut against each other when the cards are being displayed.

If desired, the upper ends of the pivots 16 may be simply formed with hooks 26 respectively to hook into the corresponding openings 27 formed in the lower edges of the cards. The cards are preferably provided with light metal binding strips 28 which may be of channel form. These binding strips may extend along the upper and lower edges so as to stiffen the cards at the points where the pivots 16 and 17 attach to them. If desired similar binding strips can be run along the free edges 29 of the cards.

If it is desired to provide a mounting for the pivots that will be more accurate than they will be when employing the hooks 26, I may provide a construction as illustrated in Figure 4 in which the pivot 30 is in the form of a stem or shaft mounted to rotate in the collar 31 and having the hook 32 at its lower end to hook onto its upper end 33. The upper end of the stem 30 is formed into a flat clamp having two plate-like jaws 34 that are clamped over the lower edge of the card 7.

If it is not desired to employ coil springs 33, I may derive the torsional effect by using a long stem 35 (see Figure 5) that extends down through an opening 36 in an upper collar or disk 37 in which it rotates freely, the lower end of the stem being provided with a square neck 38 received in a square opening 39 in a lower collar or disk 40. These stems 35 will be constantly under a torsional strain and whenever permitted to do so by the pins 21, 22, 23 and 24 will rotate the card forwardly on its own individual axis of rotation.

In the embodiment of the invention shown in Figure 7, I form a casing of two frames 41 and 42 constructed like the frame 1 but disposed in planes at right angles to each other. The shaft 43 of the apparatus being disposed at the intersection; in this way eight display openings are formed for displaying single cards. The driving apparatus will be the same as that described in connection with Figure 1. In Figure 7, 44 indicates the position of the pivots for the cards; the frames would be provided with pins 45 and 46 located as indicated which cooperate with the cards 47 in the manner indicated. The direction of rotation will be clockwise as indicated by the arrow. The pin 45 would detain one or more cards back of the displayed card whereas the pin 46 would engage the forward face of the displayed card on the other side of the frame.

In Figure 8, I illustrate an embodiment of the invention for use with transparent cards. In this embodiment, the casing 48 is in the form of a box with the two opposite corners 49 cut away, that is to say, the casing at this point is cut with reentrant angles. The interior of the box is provided with two lamps 50, each lamp being opposite the corresponding display opening 51. As the shaft 52 rotates the free edges of the cards engage with detents 53 that hold the card in the display opening 51 so that the card can be seen by a transmitted light. The casing is further provided with a pair of detent pins 54 to hold back the bank of cards as indicated at 55 so that they do not intercept the light passing from the lamp to the displayed card.

If desired, the casing may be provided with other detent means 56 located at two other openings 57 which will stop the cards or some of them in such a way that other cards such as the cards 58 will be displayed to view from a certain position but without being illuminated as a transparency.

If the apparatus is used in outdoor advertising where the casing is exposed to the weather, I prefer to adopt a construction such as that indicated in Figure 9 in which I locate the motor 59 in an elevated position in the casing 60 together with the operating mechanism 61 similar to that illustrated in Figure 1.

In other words, I simply place the motor and other mechanism in a position where it will be housed in, and out of reach of rain and snow.

If the apparatus is constructed of large size and it is desired to provide supports for the outer edges of the advertising cards, I provide a frame of the type of frame 1 with oppositely disposed guide means 62 (see Figure 10). This guide means is in the form of an arc-shaped bar that extends along under the lower edge of the card when it swings on its individual pivot. In Figure 10, dotted lines at 63 indicate the position of the card as it is swinging along one of these guides. In Figures 11 and 12, I illustrate another embodiment of the torsion means. In this case, each torsion means consists of a spiral spring 64 preferably a flat spring, the inner end of which is rigidly secured to the pivot 65 of the corresponding card. The pivot 65 is freely rotatable in collars 66 and 67 rigidly secured to the main shaft 69, the outer end of each spring is bent down and secured in radial slot 68 formed in the edge of the disk 67. In this embodiment the upper and lower pivots of the cards are integrally connected by a flat bar 70 (see Figure 14). This flat bar has its flat faces disposed in the plane of the card and lies between two cards 71 (see Figure 14), the lower edges of which are received in the groove of a channel-shaped binding strip 72.

If the cards are heavy this binding strip 72 may be braced with diagonal flat braces 73. These braces 73 may be very thin and they are simply tension members to keep the cards in place and to brace the channel bars 72. The webs of the lower channels 72 may be provided with slots 74 or openings at the points where these stems or spindles 70 pass through.

I shall now describe briefly, the mode of operation of the device. Referring to the form of the invention shown in Figures 1 and 11 and particularly Figure 1, as the disk 10 is rotated by the motor 9 the pin 11 rotates the gear wheel 12 and the shaft 8 with a step-by-step movement. As the shaft rotates in the direction of the arrow (see Figure 3), the cards 7 are detained by the pins 21 and 22 to display the forward side of each card. After a certain period of time, the card corresponding to the card 7c will become released from a corresponding pin such as the pin 22 and the spring 18 exerting torsion on the lower pivot 16 of the card will cause the card to swing around on its own individual pivot and come into the position occupied by the card 7b. On this side of the frame a bank of cards 7a are detained by a pin 24 so that the card 7b will lie substantially in the same plane as the card 7c with the edges 25 of these two cards matching together. This enables printing to be placed on the cards so that it reads across the matching line.

The spiral springs 64, if desired, may be of such large diameter that they overlap each other, in which case, they are located in alternate rows. This enables coil springs of considerable diameter to be employed.

In Figure 7 the cards are displayed singly so that eight cards are displayed simultaneously, each card being visible from a different direction. In Figure 8 the pins 54 operate to hold back the bank of cards that are not being displayed, so as to hold them out of the path of the rays of light from the lamps 50 that shine through the displayed cards that are being displayed in the openings 51.

It is understood that the embodiment of the invention described herein is only one of the many embodiments this invention may take, and I do not wish to be limited in the practice of the invention, nor in the claims to the particular embodiment set forth.

What I claim is:

1. In an advertising device of the kind described, the combination of a frame, a plurality of advertising cards mounted for rotation about a common axis so that two cards can be displayed simultaneously with their adjacent edges abutting against each other adjacent the axis of rotation, a disc having a plurality of openings corresponding to the cards, a pivot corresponding to each card rotatably mounted in its corresponding opening, means for rotating the disc with a step-by-step movement, means for subjecting the pivots to a torsional stress, and means located at each side of the said axis of rotation, and in the path of the cards to arrest the same in their displaying position.

2. In an advertising device of the kind described, the combination of a frame, a plurality of advertising cards mounted for rotation about a common axis so that two cards can be displayed simultaneously with their adjacent edges abutting against each other adjacent the axis of rotation, a disc having a plurality of bearing openings adjacent the inner edges of the cards, another disc having a plurality of bearing openings adjacent the opposite edge of the cards, aligning with the first named openings, a pivot corresponding to each card rotatably mounted in its corresponding bearing opening, means for rotating one of the discs with a step-by-step movement, means for subjecting the pivots to a torsional stress for yieldingly urging the cards to rotate on their pivots, and means located at each side of the said axis of rotation, and in the path of the cards to arrest the same in their displaying position.

3. In an advertising device of the kind described, the combination of a frame, a plurality of advertising cards mounted for rotation about a common axis so that two cards can be displayed simultaneously with their adjacent edges abutting against each other adjacent the axis of rotation, a disc having a plurality of openings corresponding to the cards, a pivot corresponding to each card rotatably mounted in its corresponding opening, means for rotating the disc with a step-by-step movement, a spring associated with each pivot for exerting a torsional stress tending to rotate the cards on their pivots, and means located at each side of the said axis of rotation, and in the path of the cards to arrest the same in their displaying position.

4. In an advertising device of the kind described, the combination of a frame, a rotatable shaft supporting the frame, a pair of discs carried by the shaft shaft, a plurality of cards with pivots at their opposite edges, said discs having aligning bearing openings for said pivots, means for rotating the shaft with a step-by-step movement, a coil spring corresponding to each pivot at one edge of the cards, having a spiral coil with its inner end attached to its corresponding pivot and its outer end secured to the adjacent disc, said springs exerting a torsional stress on the cards tending to rotate the same on their pivots, and means in the path of the cards for arresting the same in their displaying position, the alternate springs being located on a different level from the others so as to enable the coils to be made of relatively large diameter.

5. In an advertising device of the kind described the combination of a casing, a shaft mounted for rotation in the casing, a pair of discs mounted on the shaft, a plurality of card holders located between the discs, card spindles corresponding to the different card holders having extensions carrying the card holders and having pivots rotatably supported in the discs, means for rotating the shaft, means for subjecting the card spindles to a torsional stress, and relatively fixed means in the path of the card holders located at each side of the said axis of rotation to arrest the cards in their displaying position.

6. In an advertising device of the kind described the combination of a casing, a shaft mounted for rotation in the casing, a pair of discs mounted on the shaft, a plurality of card holders located between the discs, card spindles corresponding to the different card holders having flat extensions located at the card holders with the flat extensions lying substantially in the plane of the card holders, said card spindles having pivots rotatably supported in the discs, means for rotating the shaft with a step-by-step movement, means for subjecting the card spindles to a torsional stress, and means in the path of the card holders to arrest the same in the displaying position for the cards.

7. In an advertising device for displaying advertising cards so that they can be seen from different directions, the combination of a frame having openings in different planes, means for supporting the same for rotation about a common axis with a pivot corresponding to each card, means for rotating the cards on their common axis, and means corresponding to the different openings and projecting into the path of the cards for arresting the same in the displaying position, said frame having recesses receiving the free edges of the cards, and projecting across the front of the free edges of the cards behind the displayed cards.

8. In an advertising device of the kind described for displaying advertising cards so that they can be seen from different directions, the combination of a frame having a plurality of display openings located in different substantially radial planes with respect to a central axis, a plurality of advertising cards, means for supporting the same to rotate on a common axis substantially coinciding with the first named axis, and for rotation on an individual axis corresponding to each card, means for rotating the cards on the common axis, means corresponding to each display opening for arresting single cards in succession at the display opening, and means for illuminating the displayed card.

9. In an advertising device of the kind described, the combination of a frame having oppositely disposed display openings, a plurality of cards, means for supporting the cards in said frame for rotation on a common axis located between said display openings, said means having individual pivots corresponding to the cards, located so that adjacent edges of two displayed cards substantially abut against each other so as to display simultaneously the areas of two cards, means for rotating the cards on their common axis of rotation, and means in the path of the cards at both of the display openings and on both sides of the said common axis for arresting the cards in the openings.

10. In an advertising device of the kind described for displaying cards, the combination of a frame having two display openings located opposite to each other, a shaft mounted for rotation in said frame between said openings, a pair of collars carried on said shaft and having aligning bearing openings therein, a plurality of cards having pivots mounted in corresponding bearing openings, means for rotating the shaft, and means corresponding to the openings in the path of the cards for arresting the same at the openings, said last named means being located at each side of the said shaft, said frame having means for substantially hiding the free edges of the cards back of the displayed cards.

11. In an advertising device for displaying transparent cards so that they can be seen from different directions, the combination of a casing having a pair of display openings visible from opposite directions, a plurality of transparent cards, means for supporting the cards in the casing and for displaying single cards in succession at said openings, and means for illuminating from the rear each card displayed at the opening.

12. In an advertising device for displaying advertising cards so that they can be seen from different directions, the combination of a frame comprising two open frames disposed in planes substantially radial from a central axis and intersecting each other substantially at right angles, a shaft rotatably mounted in the frame substantially on said central axis near the intersection of the planes of the two open frames, a plurality of advertising cards, means for supporting the same on said shaft including individual pivots for the cards, means for rotating the shaft, and means in the path of the cards for arresting the same at said openings in their displaying position.

Signed at Los Angeles, California, this 26th day of August, 1930.

WILLIAM H. McDONALD.